United States Patent
Coburn et al.

(10) Patent No.: US 9,690,466 B2
(45) Date of Patent: Jun. 27, 2017

(54) METHOD AND APPARATUS FOR DISPLAYING SINGLE AND INTERNET RADIO ITEMS IN A PLAY QUEUE

(71) Applicant: Sonos, Inc., Santa Barbara, CA (US)

(72) Inventors: Arthur L. Coburn, Lexington, MA (US); Nicholas A. J. Millington, Santa Barbara, CA (US); Paul Wren, Montecito, CA (US); Andrew J. Schulert, Cambridge, MA (US); Robert A. Lambourne, Santa Barbara, CA (US); Jonathan P. Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 246 days.

(21) Appl. No.: 13/848,585

(22) Filed: Mar. 21, 2013

(65) Prior Publication Data
US 2013/0219273 A1    Aug. 22, 2013

Related U.S. Application Data

(63) Continuation of application No. 11/126,871, filed on May 11, 2005.
(Continued)

(51) Int. Cl.
*G06F 3/0484* (2013.01)
*G06F 3/01* (2006.01)
(Continued)

(52) U.S. Cl.
CPC ............ *G06F 3/04847* (2013.01); *G06F 3/01* (2013.01); *G06F 3/0482* (2013.01);
(Continued)

(58) Field of Classification Search
CPC .. G06F 3/0482; G06F 3/0484; G06F 3/04847; G06F 3/01; G06F 3/165
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| WO | 0153994 | 7/2001 |
| WO | 03093950 A2 | 11/2003 |

OTHER PUBLICATIONS

Krishnan, Venky, and S. Grace Chang. "Customized internet radio." Computer Networks 33.1 (2000): 609-618.*

(Continued)

*Primary Examiner* — David Phantana Angkool
(74) *Attorney, Agent, or Firm* — McDonnell Boehnen Hulbert & Berghoff LLP

(57) ABSTRACT

Techniques for managing a playlist in a multimedia system are disclosed. According to one aspect of the techniques, the playlist is structured to be able to include as many items as desired. To facilitate the manageability of such playlist, the playlist is built with a plurality of items. Each of the items is associated with metadata that includes information related to, for example, artist, album, genre, composer, and track number. The metadata for each item may be parsed, updated or logically operated upon to facilitate the management of the playlist. In another embodiment, each of the items is either a single item or a group item. A single item contains metadata of a corresponding source. A group item contains metadata of accessing other constituent items, which again may be single items or group items. As a result, the playlist can accommodate as many items as desired in a limited (Continued)

memory space without compromising the manageability of the playlist. Each of the items can be removed from, added to, or moved around in the playlist without concerning that an item may further include many items therein.

23 Claims, 10 Drawing Sheets

Related U.S. Application Data

(60) Provisional application No. 60/577,450, filed on Jun. 5, 2004.

(51) Int. Cl.

| | |
|---|---|
| *G06F 17/30* | (2006.01) |
| *G06F 3/0482* | (2013.01) |
| *H04N 5/445* | (2011.01) |
| *H04N 21/482* | (2011.01) |
| *G11B 27/031* | (2006.01) |
| *G11B 27/10* | (2006.01) |
| *G11B 27/32* | (2006.01) |
| *G06F 3/16* | (2006.01) |

(52) U.S. Cl.
CPC ........ *G06F 3/0484* (2013.01); *G06F 3/04842* (2013.01); *G06F 3/165* (2013.01); *G06F 17/30053* (2013.01); *G11B 27/031* (2013.01); *G11B 27/105* (2013.01); *G11B 27/329* (2013.01); *H04N 5/44513* (2013.01); *H04N 21/4825* (2013.01); *H04N 2005/44556* (2013.01)

(58) Field of Classification Search
USPC ........................................................ 715/716
See application file for complete search history.

(56) References Cited

U.S. PATENT DOCUMENTS

| | | | |
|---|---|---|---|
| 5,923,902 A | 7/1999 | Inagaki | |
| 5,974,299 A * | 10/1999 | Massetti | 725/14 |
| 6,032,202 A | 2/2000 | Lea et al. | |
| 6,199,076 B1 * | 3/2001 | Logan et al. | 715/203 |
| 6,255,961 B1 | 7/2001 | Van Ryzin et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,678,215 B1 * | 1/2004 | Treyz | G04G 13/028 368/10 |
| 6,757,517 B2 | 6/2004 | Chang | |
| 6,778,869 B2 | 8/2004 | Champion | |
| 6,953,886 B1 | 10/2005 | Looney et al. | |
| 7,020,048 B2 | 3/2006 | McComas | |
| 7,130,608 B2 | 10/2006 | Hollstrom et al. | |
| 7,130,616 B2 * | 10/2006 | Janik | H04L 12/2898 348/460 |
| 7,136,934 B2 * | 11/2006 | Carter et al. | 709/248 |
| 7,143,939 B2 | 12/2006 | Henzerling | |
| 7,236,773 B2 | 6/2007 | Thomas | |
| 7,281,034 B1 * | 10/2007 | Eyal | 709/219 |
| 7,295,548 B2 | 11/2007 | Blank et al. | |
| 7,469,283 B2 * | 12/2008 | Eyal et al. | 709/223 |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,668,936 B1 * | 2/2010 | Krikorian | H04N 5/44543 707/705 |
| 7,797,446 B2 | 9/2010 | Heller et al. | |
| 7,827,259 B2 | 11/2010 | Heller et al. | |
| 7,853,341 B2 | 12/2010 | McCarty et al. | |
| 7,958,441 B2 | 6/2011 | Heller et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,131,389 B1 * | 3/2012 | Hardwick | G11B 27/002 700/94 |
| 8,234,395 B2 | 7/2012 | Millington | |
| 8,483,853 B1 | 7/2013 | Lambourne | |
| 8,712,471 B2 * | 4/2014 | Wang | H04N 21/4122 455/556.1 |
| 8,818,538 B2 | 8/2014 | Sakata | |
| 8,996,145 B2 | 3/2015 | Malcolm et al. | |
| 9,531,779 B2 * | 12/2016 | Pantos | G06F 17/30053 |
| 9,584,591 B1 * | 2/2017 | Weel | H04L 67/10 |
| 2001/0030667 A1 * | 10/2001 | Kelts | 345/854 |
| 2001/0042107 A1 | 11/2001 | Palm | |
| 2002/0002039 A1 * | 1/2002 | Qureshey | G06F 17/30749 455/344 |
| 2002/0011923 A1 * | 1/2002 | Cunningham | H04B 3/542 340/12.32 |
| 2002/0022453 A1 | 2/2002 | Balog | |
| 2002/0026442 A1 | 2/2002 | Lipscomb | |
| 2002/0068558 A1 * | 6/2002 | Janik | H04L 12/2898 455/426.1 |
| 2002/0069412 A1 * | 6/2002 | Philips | 725/43 |
| 2002/0098813 A1 * | 7/2002 | Likourezos | H04B 1/04 455/93 |
| 2002/0112237 A1 * | 8/2002 | Kelts | 725/39 |
| 2002/0113824 A1 * | 8/2002 | Myers, Jr. | G06F 3/0481 715/810 |
| 2002/0124097 A1 | 9/2002 | Isely | |
| 2002/0147728 A1 | 10/2002 | Goodman et al. | |
| 2002/0152278 A1 * | 10/2002 | Pontenzone | H04H 20/42 709/217 |
| 2003/0157951 A1 | 8/2003 | Hasty, Jr. | |
| 2004/0024478 A1 | 2/2004 | Hans | |
| 2004/0025184 A1 | 2/2004 | Hakenberg et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0141476 A1 * | 7/2004 | Chumbley et al. | 370/326 |
| 2004/0158555 A1 | 8/2004 | Seedman et al. | |
| 2004/0202059 A1 * | 10/2004 | McComas | 369/30.07 |
| 2004/0260682 A1 * | 12/2004 | Herley et al. | 707/3 |
| 2004/0261040 A1 | 12/2004 | Radcliffe et al. | |
| 2005/0138193 A1 * | 6/2005 | Encarnacion et al. | 709/230 |
| 2005/0251566 A1 * | 11/2005 | Weel | G06Q 30/06 709/219 |
| 2006/0095331 A1 * | 5/2006 | O'Malley et al. | 705/22 |
| 2006/0168340 A1 | 7/2006 | Heller et al. | |
| 2007/0142944 A1 | 6/2007 | Goldberg | |
| 2009/0205003 A1 * | 8/2009 | Benyamin | H04N 21/8543 725/109 |
| 2010/0110200 A1 * | 5/2010 | Lau | G11B 27/034 348/207.1 |
| 2010/0114857 A1 * | 5/2010 | Edwards | G06F 17/30817 707/709 |
| 2012/0059825 A1 * | 3/2012 | Fishman | G06F 17/30053 707/737 |
| 2012/0060195 A1 * | 3/2012 | Fishman | H04N 21/252 725/58 |
| 2012/0311443 A1 | 12/2012 | Chaudhri et al. | |
| 2014/0052770 A1 * | 2/2014 | Gran | H04N 21/26258 709/203 |
| 2014/0324201 A1 * | 10/2014 | Coburn, IV | H04N 21/43615 700/94 |
| 2015/0188975 A1 * | 7/2015 | Hansen | H04L 67/1068 709/231 |
| 2015/0228000 A1 * | 8/2015 | Bijor | G06Q 30/0613 705/13 |
| 2015/0371529 A1 * | 12/2015 | Dolecki | G08C 17/02 700/94 |

(56) References Cited

U.S. PATENT DOCUMENTS

| | | | | |
|---|---|---|---|---|
| 2015/0378522 | A1* | 12/2015 | Butts | G06F 3/0482 715/716 |
| 2016/0299665 | A1* | 10/2016 | Tripoli | G06F 3/04842 |
| 2017/0078305 | A1* | 3/2017 | Murrells | H04L 63/107 |
| 2017/0078714 | A1* | 3/2017 | Gavade | H04N 21/43615 |

OTHER PUBLICATIONS

"MusicMatch First Jukebox Software to Integrate Internet Radio Tuner, Offering the Most Powerful Music Playback and Streaming Capabilities Available . . . " The Free Library. 2000 PR Newswire Association LLC.*

"ReQuest Multimedia Selects Quantum Corporation to Provide Audio Storage Technology for New MP3 Home Stereo Jukebox . . . " The Free Library. 1999 Business Wire.*

United States Patent and Trademark Office, "Advisory Action", issued in connection with U.S. Appl. No. 11/126,871, mailed on Aug. 22, 2014, 4 pages.

Bluetooth, "Specification of the Bluetooth System: The ad hoc SCATTERNET for affordable and highly functional wireless connectivity" Core, Version 1.0 A, Jul. 26, 1999, 1068 pages.(Document uploaded in 7 different files: NPL2_part1 pp. 1 to 150, NPL2_part2 pp. 151 to 300, NPL2_part3 pp. 301 to 450, NPL2_part4 pp. 451 to 600,NPL2_part5 pp. 601 to 750, NPL2_part6 pp. 751 to 900 and NPL2_part7 pp. 901 to 1068).

Bluetooth. "Specification of the Bluetooth System: Wireless connections made easy" Core, Version 1.0 B, Dec. 1, 1999, 1081 pages.(Document uploaded in 8 different files: NPL3_part1 pp. 1 to 150, NPL3_part2 pp. 151 to 303, NPL3_part3 pp. 304 to 453, NPL3_part4 pp. 454 to 603,NPL3_part5 pp. 604 to 703, NPL3_part6 pp. 704 to 854 and NPL3_part7 pp. 855 to 1005, NPL3_part8 pp. 1006 to 1081).

Dell, Inc., "Dell Digital Audio Receiver: Reference Guide", Jun. 2000, 70 pages.

Dell, Inc., "Start Here", Jun. 2000, 2 pages.

Jo J., et al., "Synchronized One-to-many Media Streaming with Adaptive Playout Control", Proceedings of SPIE, 2002, vol. 4861, pp. 71-82.

Jones, Stephen, "Dell Digital Audio Receiver: Digital upgrade for your analog stereo" Analog Stereo, Jun. 24, 2000 < http://www.reviewsonline.com/articles/961906864.htm> retrieved Jun. 18, 2014, 2 pages.

Louderback, Jim, "Affordable Audio Receiver Furnishes Homes With MP3",TechTV Vault, Jun. 28, 2000 <http://www.g4tv.com/articles/17923/affordable-audio-receiver-furnishes-homes-with-mp3/> retrieved Jul. 10, 2014, 2 pages.

Palm, Inc., "Handbook for the Palm VII Handheld", May 2000, 311 pages.

Microsoft Corp., "Universal Plug and Play Device Architecture", Jun. 8, 2000, version 1.0, pp. 1-54.

"Presentations at WinHec 2000, "Building an Audio Appliance"; May 2000, 138 pages".

United States Patent and Trademark Office, "Final Office Action", issued in connection with U.S. Appl. No. 11/126,871, mailed on May 24, 2013, 24 pages.

United States Patent and Trademark Office, "Non-Final Office Action", issued in connection with U.S. Appl. No. 11/126,871, mailed on Dec. 9, 2013,14 pages.

United States Patent and Trademark Office, "Non-Final Office Action", issued in connection with U.S. Appl. No. 11/126,871, mailed Feb. 9, 2015, 15 pages.

United States Patent and Trademark Office, "Non-Final Office Action," issued in connection with U.S. Appl. No. 11/126,871, mailed on Nov. 30, 2012, 22 pages.

United States Patent and Trademark Office, "Final Office Action," issued in connection with U.S. Appl. No. 11/126,871, mailed on Aug. 27, 2012, 19 pages.

United States Patent and Trademark Office, "Non-Final Office Action," issued in connection with U.S. Appl. No. 11/126,871, mailed on Feb. 6, 2012, 28 pages.

United States Patent and Trademark Office, "Final Office Action," issued in connection with U.S. Appl. No. 11/126,871, mailed on Aug. 24, 2010, 27 pages.

United States Patent and Trademark Office, "Non-Final Office Action," issued in connection with U.S. Appl. No. 11/126,871, mailed on Feb. 3, 2010, 28 pages.

United States Patent and Trademark Office, "Final Office Action," issued in connection with U.S. Appl. No. 11/126,871, mailed on Sep. 15, 2009, 25 pages.

United States Patent and Trademark Office, "Non-Final Office Action," issued in connection with U.S. Appl. No. 11/126,871, mailed on Mar. 31, 2009, 23 pages.

United States Patent and Trademark Office, "Final Office Action," issued in connection with U.S. Appl. No. 11/126,871, mailed on Nov. 26, 2008, 24 pages.

United States Patent and Trademark Office, "Non-Final Office Action," issued in connection with U.S. Appl. No. 11/126,871, mailed on May 1, 2008, 23 pages.

Voyetra Turtle Beach, Inc., AudioTron Quick Start Guide, Version 1.0, Mar. 2001 (24 pages).

Voyetra Turtle Beach, Inc., Audiotron Reference Manual, Version 3.0, May 2002 (70 pages).

Voyetra Turtle Beach, Inc., AudioTron Setup Guide, Version 3.0, May 2002 (32 pages).

PRISMIQ, "MediaPlyer User Guide," PRISMIQ, Inc., 2003, 44 pages.

United States Patent and Trademark Office, "Final Office Action", issued in connection with U.S. Appl. No. 11/126,871, mailed on Jun. 12, 2014, 15 pages.

Final Office Action mailed on Jun. 15, 2016, issued in connection with U.S. Appl. No. 11/126,871, filed May 11, 2005, 18 pages.

Non-Final Office Action mailed on Aug. 17, 2016, issued in connection with U.S. Appl. No. 13/798,977, filed Mar. 13, 2013, 31 pages.

International Searching Authority, International Search Report and Written Opinion mailed on Jun. 22, 2016, issued in connection with International Application No. PCT/US2016/026512, filed on Apr. 7, 2016, 14 pages.

"Denon 2003-2004 Product Catalog," Denon, 2003-2004, 44 pages.

Non-Final Office Action mailed on Oct. 28, 2016, issued in connection with U.S. Appl. No. 11/126,871, filed May 11, 2005, 20 pages.

Non-Final Office Action mailed on Dec. 28, 2015, issued in connection with U.S. Appl. No. 11/126,871, filed May 11, 2005, 17 pages.

Advisory Action mailed on Feb. 10, 2016, issued in connection with U.S. Appl. No. 13/798,977, filed Mar. 13, 2013, 3 pages.

Final Office Action mailed on Dec. 21, 2016, issued in connection with U.S. Appl. No. 13/798,977, filed Mar. 13, 2013, 32 pages.

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

Final Office Action mailed on Oct. 21, 2015, issued in connection with U.S. Appl. No. 13/798,977, filed Mar. 13, 2013, 28 pages.

United States Patent and Trademark Office, "Advisory Action", issued in connection with U.S. Appl. No. 11/126,871, mailed on Jul. 12, 2013, 3 pages.

United States Patent and Trademark Office, "Advisory Action", issued in connection with U.S. Appl. No. 11/126,871, mailed on Nov. 5, 2012, 3 pages.

(56) References Cited

OTHER PUBLICATIONS

United States Patent and Trademark Office, "Non-Final Office Action", issued in connection with U.S. Appl. No. 13/798,977, mailed on May 5, 2015, 53 pages.

Final Office Action mailed on Jul. 8, 2015, issued in connection with U.S. Appl. No. 11/126,871, filed May 11, 2005, 17 pages.

* cited by examiner

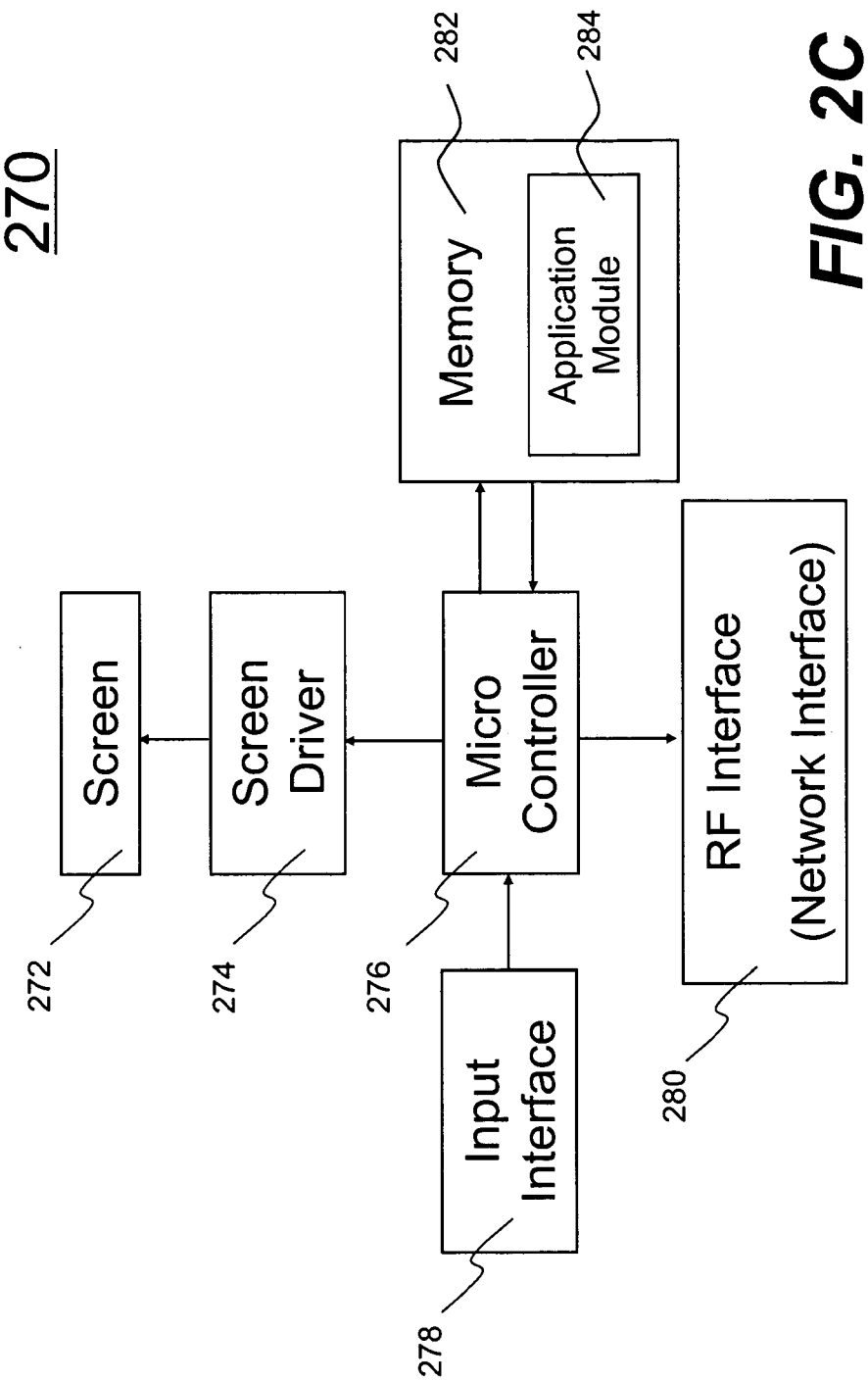

300

♪ Here comes the sun
♪ New York New York
➢ Purple Rain
♪ Lucky in the sky with diamonds

♪ Here comes the sun — 352
   354 — Jazz [234 tracks]
♪ New York New York — 356
   358 — Elvis Costello [45 tracks]
♪ Lucy in the sky with diamonds — 360
♪ Every day is like Sunday — 364
   362 — Abbey Road (17 tracks)

*FIG. 3B*

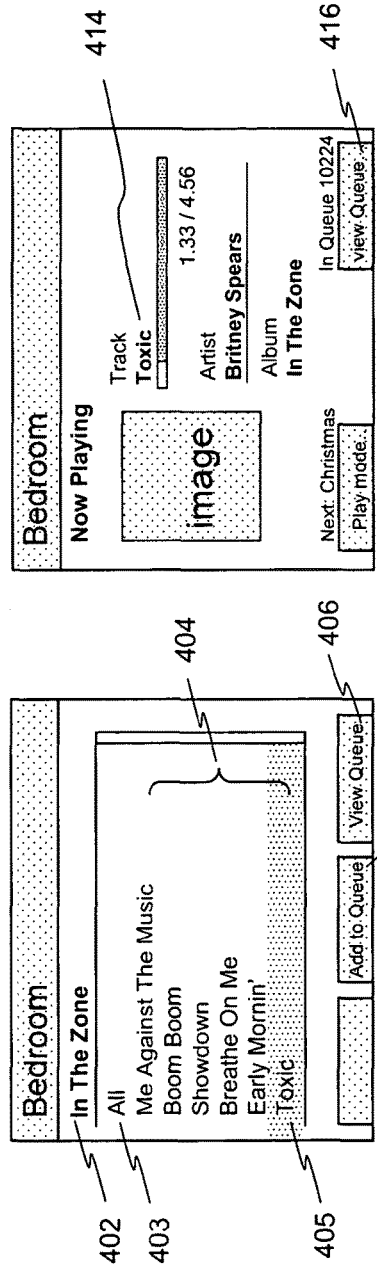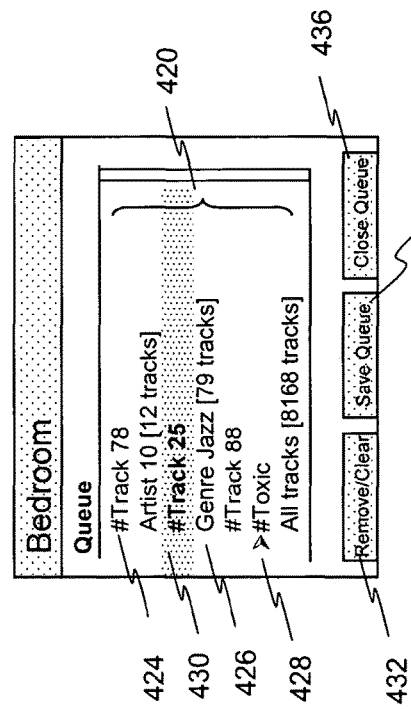
FIG. 4A
FIG. 4B
FIG. 4C

METHOD AND APPARATUS FOR DISPLAYING SINGLE AND INTERNET RADIO ITEMS IN A PLAY QUEUE

CROSS-REFERENCE TO RELATED APPLICATION

This application claims the benefits of U.S. patent application Ser. No. 11/126,871, entitled "Method and apparatus for managing a playlist", filed on May 11, 2005, and U.S. Provisional Patent Application No. 60/577,450, filed on Jun. 5, 2004, entitled "Method and apparatus for managing a playlist", both of which are hereby incorporated by reference for all purposes.

BACKGROUND OF THE INVENTION

Field of the Invention

The invention is generally related to the area of multimedia technologies in consumer electronics industry. In particular, the invention is related to techniques for managing a playlist for playback, wherein the playlist is structured based on metadata to accommodate as many items as desired in a limited memory space without compromising the manageability of the playlist.

The Background of Related Art

The desire of enjoying multimedia productions such as music audio or video has been growing along with the advance of technologies in the consumer electronics industry. With the proliferation of the digital multimedia, a user can easily possess a large collection of audio or video files. One of the preferable ways to listen to or view these files is to play the files in accordance with a playlist. The playlist is an ordered list of a group of multimedia items. A player can play all items in the playlist, one after another in a certain order. In general, a user would create a playlist suited for his/her personal preference. Using a playlist, a person can choose only the audios or videos he/she likes and skip over others. For example, a person likes only to listen to a couple of tracks in an album including many tracks, or a particular album or few audio tracks from a selected artist. A playlist can be helpful and used to organize the selected items and skip over those unselected without further interventions from a user.

Traditionally, the playlist employs a linear data structure to store information of each item in the memory. The information contains an address identifier (e.g., Uniform Resource Locator or URL) that points to a playable media source and a name identifier for identifying the playable source (e.g., a name of a track, or a string including a name of the track plus an artist name, a name of an album and/or a type of music). Using a playlist for audios as an example, a user can add tracks to the playlist by browsing a music library first and then selecting either one track or a group of tracks in the music library.

As the number of favorable tracks in a playlist increases, it would be difficult or tedious to manage the playlist. For example, it is assumed that a person has a collection of music library with 5000 song tracks in several albums as shown in FIG. 6. If a playlist 600 was to be created to include personal favorable tracks that take up only 25% of the entire collection, the playlist 600 will have 1250 tracks. Deleting, adding or swapping the positions of tracks is a matter of managing the playlist 600 of 1250 tracks. However, if the collection further increases, the playlist 600 would grow into a lengthy list (e.g., greater than 10,000 tracks) that would eventually defeat the purpose of having a playlist, because the structure of such playlist is not meant for managing so many tracks. For example, when a new album or a group of tracks is added into a playlist, depending on the location the new album is added in the playlist, many items originally in the playlist will be sequentially shifted to accommodate the individual items in the album or the group. The added individual items do not preserve the group information as to the origin of the source (e.g., which album these tracks are from or information regarding an operation of how they are added). After some manipulations on the playlist (e.g., random play, adding new tracks, or re-ordering of tracks), when an album is to be deleted from the playlist, such operation could be difficult because no exact information is available as to which items belong to the album. Often, a user has to go through the entire playlist to manually select those that are believed belong to the album for deletion from the playlist.

There is, therefore, a need for managing a playlist with intelligent and flexible manipulation. To accommodate a growing playlist, there is another need for solutions that manage the playlist with as many items as desired, in a given memory space, without sacrificing the manageability of the playlist.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to managing a playlist in a multimedia system. One exemplary multimedia system is a multi-zone audio system with terminal players in respective zones. According to one aspect of the present invention, a playlist is managed through a controlling device that may include, but not be limited to, a remote controller, a personal digital assistant (PDA), a hand-held computing device, a laptop computer, or a desk top computer.

From the perspective of a user, a playlist contemplated in the present invention appears to contain an "unlimited" number of items without compromising the manageability of such playlist. In one embodiment, each of the items is associated with metadata that includes information related to, for example, artist, album, genre, composer, and track number thereof, or information regarding an operation of how the item is added. The metadata for each item may be parsed, updated or logically operated to facilitate the management of the playlist.

In another embodiment, each of the items is either a single item or a group item. As used hereinafter, a single item is an item pertaining to a track that, once executed or played, can be reproduced in sound or video while a group item, also referred to herein as a container, contains at least one item that may be a single item or a group item. In other words, a group item may be structured as nested directories, each containing a predefined category of single items. A single item contains metadata of a corresponding source. A group item contains metadata of accessing other items that again may be a single item or a group item.

Depending on implementation, the metadata may be a set of expressions or logic operations to indicate, for example, where sources are ultimately located, how tracks are related to a type (e.g., artist, album or genre) or how items are added into a playlist. In one embodiment, instead of storing in the memory the metadata of all items in all group items in a playlist, only the metadata of a predefined number of the group items or at a top level is physically stored in accordance with one embodiment of the present invention. This is significant improvement in terms of memory usage, because there could be hundreds or even thousands of single items within a group item. As a result, the playlist can accommodate as many items as desired in a limited memory space without compromising the manageability of the playlist.

According to another aspect of the present invention, a configurable module is implemented in the controlling device that provides interactive user interface for managing the playlist, and causes corresponding sources to be downloaded or streamed into a player or a group of players for playback. Various logic expressions may be entered via the graphic user interface to manipulate a playlist.

The present invention may be implemented in many forms including software, hardware or a combination of both. According to one embodiment, the present invention is directed to a method for managing a playlist. The method comprises: receiving the playlist structured to include at least one item, the playlist including metadata associated with the item; and determining whether the item is a single item or a group item. When the item is activated for playback, playing the item if the item is a single item, or traversing the item to obtain some of group items therein for playback if the item is a group item.

According to another embodiment, the present invention is another method for managing a playlist, the method comprises: displaying the playlist on a display screen, the playlist including a plurality of items, each of the items associating with a set of metadata, wherein the metadata includes a plurality of tags, each identifying one aspect of the item. The method further comprises accepting a logic expression provided by a user, performing an operation on the playlist in accordance with the logic expression; and displaying an updated playlist.

According to still another embodiment, the present invention is an apparatus for managing a playlist, the apparatus may include, but not be limited to, a remote controller, a personal digital assistant (PDA), a hand-held computing device, a laptop computer, or a desk top computer. The apparatus comprises: a display screen; a screen driver coupled to the display screen; a memory for storing instructions for an application module; a network interface to communicate with a data network to control one or more players; a processor coupled to the screen driver, and the memory, the processor executing the instructions to cause the apparatus to perform operations of: receiving the playlist structured to include a plurality of items, each of the items associated with a set of metadata that collects whatever information is available from a track or an album and in return pinpoints how each of the items is related to the track or the album; searching the metadata in accordance with an entry from a user, wherein the searching is performed in the metadata; and updating the metadata after an action pertaining to the entry is executed to the playlist.

One of the objects, features, and advantages of the present invention is to provide a mechanism that manages a playlist including as many items as desired without sacrificing the manageability of the playlist.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2C shows an exemplary internal functional block diagram of a controller in accordance with one embodiment of the present invention;

FIG. 3A shows an exemplary portion of a playlist in accordance with one embodiment of the present invention;

FIG. 3B shows another exemplary portion of a playlist in accordance with one embodiment of the present invention;

FIGS. 4A-4C illustrate a sequence of screen displays in accordance with one embodiment of the present invention for managing a playlist;

DETAILED DESCRIPTION OF THE PREFERRED EMBODIMENT

Figure 1:
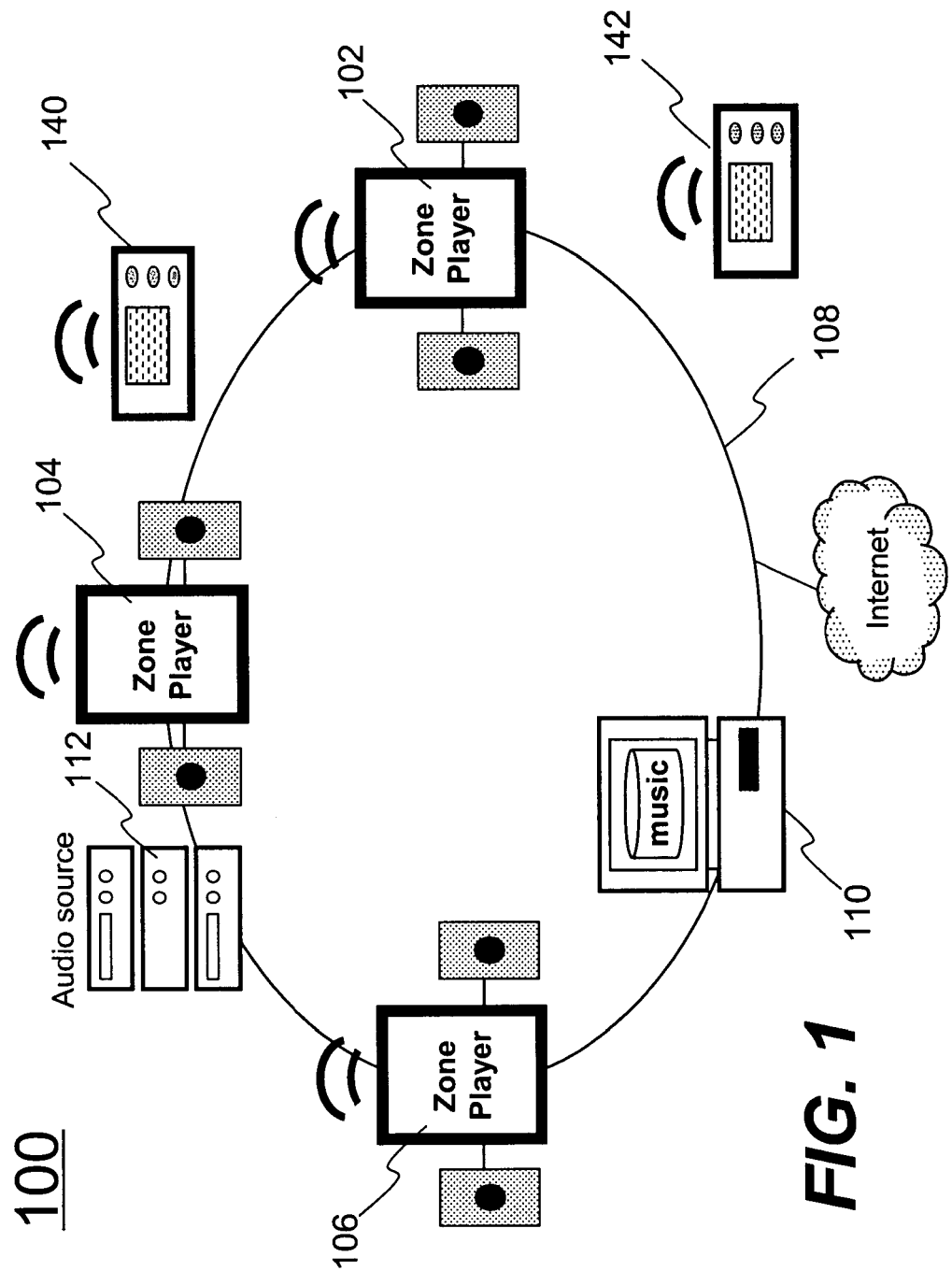
FIG. 1 shows an exemplary configuration in which the present invention may be practiced.

The present invention pertains to techniques for managing a playlist, controlling playback of media sources based upon the playlist. According to one aspect of the present invention, the playlist is constructed to be able to contain as many items as desired without compromising the manageability thereof. To facilitate the manageability of such playlist, according to one aspect of the present invention, the playlist is built with a plurality of playlist items or simply items. Each of the items is a basic building block of the playlist. In one embodiment, each of the items is associated with metadata that includes information related to, for example, artist, album, genre, composer, and track number, and/or how each item is added to a playlist. The metadata for each item may be parsed, updated or logically operated upon to facilitate the management of the playlist. In another embodiment, each of the items is either a single item or a group item. A single item contains metadata (e.g., a pointer, a URL, a path or an identifier, and/or expressions) of a single track. A group item, also referred to as a container, contains metadata (e.g., the identifier of a content directory and/or expression) for accessing other items which again may be single items and group items. A single item pertains to a single playable source that may be a sound track or a video source. One example of a group item is an album that contains a collection of single items. As a result, the playlist contemplated in the present invention can accommodate as many items as desired in a limited memory space without compromising the manageability of the playlist.

According to another aspect of the techniques, a playlist can be manipulated via a user interface provided in a controlling device. The controlling device may include, but not be limited to, a remote controller, a personal digital assistant (PDA), a hand-held computing device, a laptop computer, or a desk top computer. The user interface facilitates a user to manage, create, or modify the playlist by manipulating each of the items therein, regardless it is a single or group item. The playlist may be saved and retrieved at anytime from another controlling device.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to an audio system with multi-zone capability. However, those skilled in the art will readily appreciate that the detailed description given herein with respect to the audio system is for explanatory purposes as the invention extends beyond these limited embodiments.

Referring now to the drawings, in which like numerals refer to like parts throughout the several views. FIG. 1 shows an exemplary configuration 100 in which the present invention may be practiced. The configuration may represent, but not be limited to, a part of a residential home, a business building or a complex with multiple zones. There are a number of multimedia players of which three examples 102, 104 and 106 are shown as audio devices. Each of the audio devices may be installed or provided in one particular area or zone and hence referred to as a zone player herein.

As used herein, unless explicitly stated otherwise, a track and an audio source are used interchangeably, an audio source or audio sources are in digital format and can be transported or streamed across a data network. To facilitate the understanding of the present invention, it is assumed that the configuration 100 represents a home. Thus, the zone player 102 and 104 may be located in two of the bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

All devices on the network 108 may be configured to download and store audio sources or receive streaming audio sources. For example, the computing device 110 can download audio sources from the Internet and store the downloaded sources locally for sharing with other devices on the Internet or the network 108. The zone player 106 can be configured to receive streaming audio source and share the source with other devices. Shown as a stereo system, the device 112 is configured to receive an analog source (e.g., from broadcasting) or retrieve a digital source (e.g., from a compact disk). The analog sources can be converted to digital sources. In accordance with the present invention, all audio sources, regardless of where they are located or how they are received, may be shared among the devices on the network 108.

Any device on the network 108 may be configured to control operations of the zone players 102, 104 and 106. In particular, one or more controlling devices 140 and 142 are used to control zone players 102, 104 and 106 as shown in FIG. 1. The controlling devices 140 and 142 are preferably portable and remotely control the zone players via wireless means (e.g., infrared, radio, wireless standard IEEE 802.11b or 802.11g). In one embodiment, besides controlling an individual zone player, the controlling device 140 or 142 is configured to manage audio sources and other characteristics of all the zone players regardless where the controlling device 140 or 142 is located in a house or a confined complex.

Figure 2A:
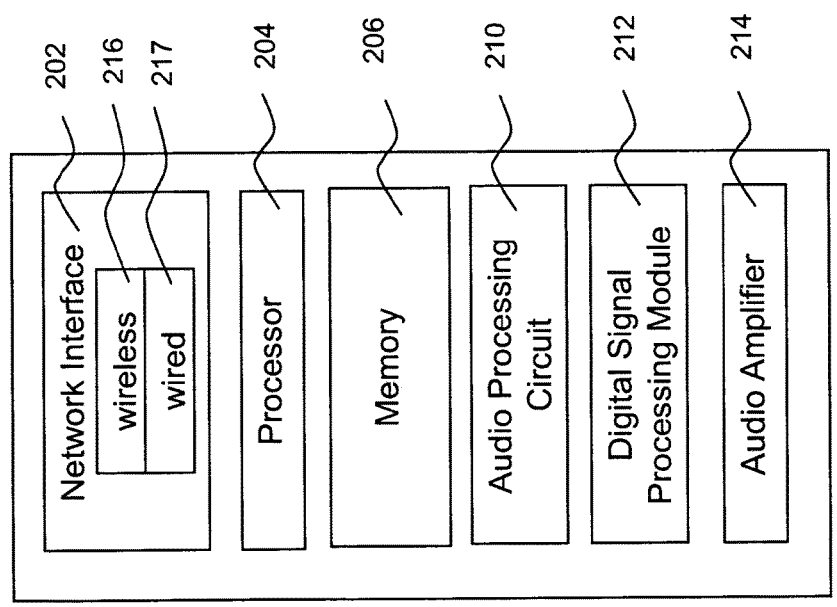
FIG. 2A shows an exemplary functional block diagram of a player in accordance with the present invention.

Referring now to FIG. 2A, there is shown an exemplary functional block diagram of a zone player 200 in accordance with the present invention. The zone player 200 includes a network interface 202, a processor 204, a memory 206, an audio processing circuit 210, a digital signal processing module 212, and an audio amplifier 214. The network interface 202 facilitates a data flow between a data network (i.e., the data network 108 of FIG. 1) and the zone player 200 and typically executes a special set of rules (i.e., a protocol) to send data back and forth. One of the common protocols is TCP/IP (Transmission Control Protocol/Internet Protocol) commonly used in the Internet. In general, a network interface manages the assembling of an audio source or file into smaller packets that are transmitted over the data network or reassembles received packets into the original source or file. In addition, the network interface 202 handles the address part of each packet so that it gets to the right destination or intercepts packets destined for the zone player 200.

The network interface 202 may include either one or both of a wireless interface 216 and a wired interface 217. The wireless interface 216, also referred to as a RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). In one embodiment, a zone player, referred to as an access zone player, includes both of the interfaces 216 and 217, and other zone players include only the RF interface 216. Thus these other zone players communicate with other devices on a network or retrieve audio sources via the access zone player. The processor 204 is configured to control the operation of other parts in the zone player 200. The memory 206 may be loaded with one or more software modules that can be executed by the processor 204 to achieve desired tasks.

The audio processing circuit 210 resembles most of the circuitry in an audio playback device and includes one or more digital-to-analog converters (DAC), an audio preprocessing part, an audio enhancement part or a digital signal processor and others. In operation, when an audio source (e.g., audio source) is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the digital signal processing module 212 may be implemented within the audio processing circuit 210 or as a combination of hardware and software. The audio amplifier 214 is typically an analog circuit that powers the provided analog audio signals to drive one or more speakers.

Figure 2B:
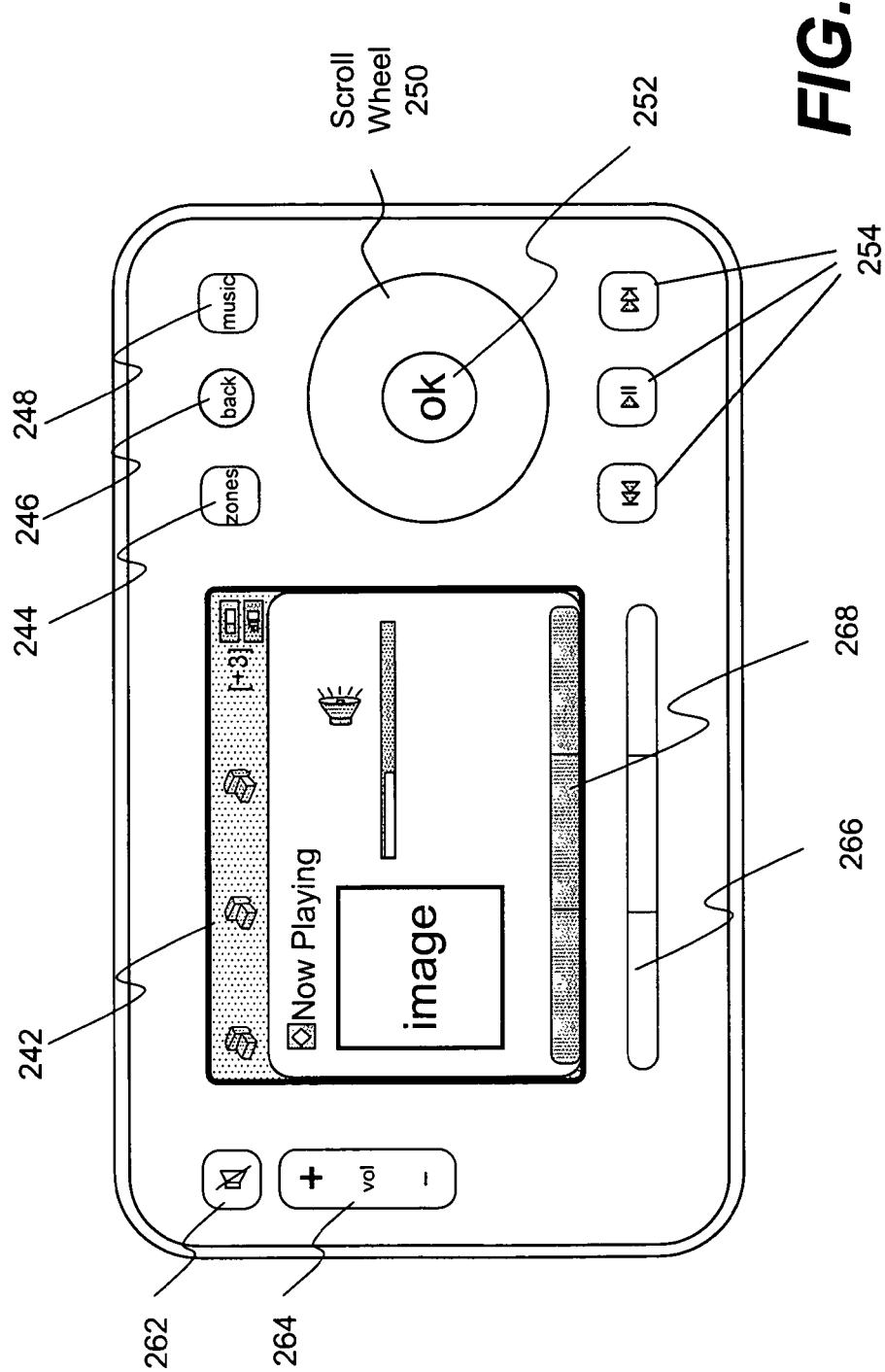
FIG. 2B shows an example of controllers that may be used to remotely control one of more players of FIG. 1.

Referring now to FIG. 2B, there is shown an example of a controller 240, which may correspond to the controlling device 140 or 142 of FIG. 1. The controller 240 may be used to facilitate the control of multi-media applications, automation and others in a living complex. In particular, the controller 240 is configured to facilitate a selection of a plurality of audio sources available on the network, controlling operations of one or more zone players (e.g., the zone player 200) through a RF interface corresponding to the wireless interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture, if there is any, associated with the audio source may be transmitted from the zone player 200 to the controller 240 for display. In one embodiment, the controller 240 is used to select an audio source for playback. In another embodiment, the controller 240 is used to manage (e.g., add, delete, move, save, or modify) a playlist.

The user interface for the controller 240 includes a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242.

The screen 242 displays various screen menus in response to a selection by a user. In one embodiment, the "zones" button 244 activates a zone management screen or "Zone Menu" to allow a user to group players in a number of desired zones so that the players are synchronized to play an identical playlist or tracks. The "back" button 246 may lead to different actions depending on the current screen. In one embodiment, the "back" button triggers the current screen display to go back to a previous one. In another embodiment, the "back" button negates the user's erroneous selection. The "music" button 248 activates a music menu, which allows the selection of an audio source (e.g., a song track) to be added to a playlist (e.g., a music queue) for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is use to confirm the user selection on the screen 242 or activate a playback of an item.

There are three transport buttons 254, which are used to control the effect of the currently playing track. For example, the functions of the transport buttons may include play/ pause and forward/rewind a track, move forward to the next track, or move backward to the previous track. According to one embodiment, pressing one of the volume control buttons such as the mute button 262 or the volume up/down button 264 activates a volume panel. In addition, there are three soft buttons 266 that can be activated in accordance with the labels 268 on the screen 242. It can be understood that, in a multi-zone system, there may be multiple audio sources being played respectively in more than one zone players. The music transport functions described herein shall apply selectively to one of the sources when a corresponding zone player is selected.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to facilitate managing a playlist with selectively adding singe or group items by a user. In another embodiment, an application module is configured to facilitate other control functions for the playlist. In yet another embodiment, a cache with a limited capacity is reserved in the memory 282 for caching metadata of a limited number of items in a playlist. In operation, when the microcontroller 276 executes one of the application modules 284, the screen driver 274 generates control signals to drive screen 272 to display an application specific user interface accordingly, more of which will be described below.

The controller 270 includes a network interface 280 referred to as a RF interface 280 that facilitates wireless communication with a zone player via a corresponding wireless interface or RF interface thereof. The controller 270 may control one or more zone players, such as 102, 104 and 106 of FIG. 1. Nevertheless, there may be more than one controllers, each preferably in a zone (e.g., a room) and configured to control any one and all of the zone players.

It should be pointed out that the controller 240 in FIG. 2B is not the only controlling device that may practice the present invention. Other devices that provide the equivalent control functions (e.g., a computing device, a PDA, a hand-held device, and a laptop computer) may also be configured to practice the present invention. In the above description, unless otherwise specifically described, it is clear that keys or buttons are generally referred to as either the physical buttons or soft buttons, enabling a user to enter a command or data.

According to one embodiment of the present invention, the basic building block of a playlist is defined as a playlist item or simply an item. In one embodiment, an item in a list is associated with metadata that includes information related to, for example, artist, album, genre, composer, and track number and/or how each item is added to a playlist. The metadata may be parsed, updated or logically operated upon to facilitate the management of the playlist. Tags are an exemplary expression of the metadata. Tags are usually stored in a format that is designed specifically for a file type. e.g. MP3 files usually have ID3 tags while OGG files have OGG tags.

FIG. 3A shows a portion of an exemplary playlist 300 with four visible items, each of the item pertains to a track and, once activated, reproduces a sound. As shown in FIG. 3A, all items are uniformly and respectively indicated with a music sign, where one of them, "Purple Rain" is being played. According to one embodiment, each item in the playlist 300 is associated with metadata that may be parsed, updated or logically operated upon to manage the playlist. To facilitate the logical operations of expressions in the metadata, metadata tags or tags are used. The following is an exemplary list of tags for a playlist:

| Atom # | tag |
|---|---|
| 1 | "Prince" |
| 2 | "Purple rain" |
| ... | ... |
| 50 | "Groove Salad" |
| ... | ... |
| 65,000 | ... |

It is assumed that there are 6500 tags in the example. Each of the tags corresponds to a category name. Whenever a track or an album is to be added into a play list, tags are created or updated to identify a category name. To facilitate logic operation of the tags, each of the tags corresponds to an identifier or an item number (e.g., a numeral). A possible view of the first four metadata tags of the above list is as follows:

| Item # | Artist | Album | Genre | Composer | TrackURL |
|---|---|---|---|---|---|
| 1 | 1 | 2 | ... | ... | ... |
| 2 | 1 | 2 | ... | ... | ... |
| 3 | 1 | 2 | ... | ... | ... |
| 4 | 1 | 2 | ... | ... | ... |

That means that the first tracks are from an album 2, "Purple rain" and by the artist 1, "Prince". When a track is added to the playlist, its item number is added along with the (compound) expression as to how it was added and its duration. For example, the queue (i.e., a playlist) could look something like this:

| Item # | Queue Expression (how was it added?) | Time |
|---|---|---|
| 4 | Album (2) | 2 min 30 sec |
| 3 | Album (2) | 3 min 45 sec |
| 10 | Track (10) | 5 min 23 sec |
| 50 | Internet Radio (50) | 30 min 0 sec |

To delete a track or list of tracks, according to one embodiment of the present invention, the Queue expression for all items is searched to match a delete expression. For example, to delete all tracks added by Album 2, simply a search for all items that were added by Album "2" is performed. Subsequently, all the tracks added by Album 2 may be readily deleted.

One of the features in this embodiment is that the metadata collects whatever information is available from a track or an album and in return pinpoints which track it is. Another one of the features in this embodiment is that the individual items (e.g., tracks) are respectively identified by numerals, which facilitate a fast search process across a playlist. Further, the metadata can be parsed, updated and logically operated to delete or add a selected track, a group of tracks or an album based on any requirement (e.g., e.g., a name of the track, a name of the artist, a name of the album, genre of the track).

According to one aspect of the present invention, the playlist stores only metadata of an item, not the actual data of a track or a source. In one embodiment, the data structure of the metadata of an item contains the following two variable length string data: 1) a location identifier for the location of a track source, and 2) a name identifier associated with the track (e.g., a name of the track, a name of the artist, a name of the album, genre of the track, etc.). The average length of the metadata for the single item is 116 bytes including 80 bytes for the location identifier, 20 bytes for a name identifier, and 16 bytes for overhead. A set of pseudo-code, according to one embodiment, is provided herein to illustrate the mechanism of an item in a playlist:

```
class PlaylistItem {
    string URL;         // variable length string - avg length 80 bytes
    string DisplayName; // variable lengths tring - avg length 20 bytes
};
Class PlayList {
    array<PlaylistItems> Items;  // variable length array
};
```

The data structure of the metadata of a group item includes at least two variable length string data: 1) CDUDN—an identifier of a content directory (e.g., a music library), and 2) ObjectId—a fixed object identifier or name of the items or containers within the content directory. The average length of the metadata for a group item has a total of 146 bytes, including 50 bytes for the content identifier (CDUDN), 80 bytes for an object identifier (ObjectId), and 16 bytes for overhead. A set of pseudo-code, according to one embodiment, is provided herein to illustrate the mechanism of a container in a playlist:

```
class StoredPlaylistItem {
    enum {
        CONTAINER,
        ITEM,
    } Type;
    union {
        struct {
            string CDUDN;    // identifier the Content Dir. - avg 50 bytes
            string ObjectId; // variable length string - avg length 80
                             bytes
        } Container;
        Struct {
            string URL;         // variable length string - avg 80 bytes
            string DisplayName;// variable lengths tring - avg 20 bytes
        } Item;
};
Class StoredPlayList {
    array<StoredPlaylistItem> Items;   // variable length array
};
```

In another embodiment, the metadata for a group item includes a set of expressions or logic operations. The expression syntax combines simple operators and Boolean logic. For example, to play all Rush and Steely Dan music, the Boolean logic expression may be:

(id3:Artist=="Rush") ||(id3:Artist=="Steely Dan")

To play anything but "Jazz", the Boolean negation expression may be:

(id3:Genre !=Jazz)

Examples of manipulating a playlist are further provided.
Example 1: a user desires to add all "Jazz" music not including those by artist "John Coltrane":
The Boolean logic expression: (Id3:Genre=="Jazz") && (id3:Artist !="John Coltrane")

Example 2: a user desires to add "U2" album "The Joshua Tree", except tracks "One Tree Hill" and "Exit"

The Boolean logic expression: ((Id3:Artist=="U2")&&(id3: Album=="The Joshua Tree"))&&((id3:Track !="One Tree Hill")&&(id3:Track !="Exit"))

Example 3: a user desires to add all U2 tracks "Bad" except the tracks on from the album "Unforgetable Fire"

The Boolean logic expression: Id3:Artist="U2")&&(id3: Tracks=="Bad"))&&(id3:Album!="Unforgetable Fire")

In operation, any device with a proper interface (e.g., a remote controller shown in FIG. 2B or a computing device) may be used to manipulate a logic expression. FIG. 3B shows a portion of an exemplary playlist 350 with seven visible items, the four single items 352, 356, 360 and 362 are single tracks and can be reproduced in sound once activated while the three group items 354, 358 and 364 are containers, each containing individual playable tracks in accordance with one type of characteristics, for example, all "Jazz" tracks are in the item 354, the tracks by an artist named "Elvis Costello" are in item 358, and the tracks in the album "Abbey Road" are in item 364. In one embodiment, to visually display distinctions between single items and group items, a sign or a flag is placed near a single item. FIG. 3B shows that a music sign "♪" is placed before a playable item, thus those that have no such music sign are group items. According to another embodiment, each of the group items can be expanded to show the titles for the individual tracks (i.e., single items).

A playlist acts like a script for playback of tracks in a zone player. A user creates a playlist by adding items to the playlist from a music library or another playlist. The music library may be organized based on the UPnP content directory structure (UPnP stands for Universal Plug and Play, is a standard that uses Internet and Web protocols to enable devices). As described herein, when an album is added to a playlist contemplated in the present invention, items in the album may be expanded and appear to be individual items in the playlist, each of the items is associated with metadata that facilitates, for example, subsequent deletion or removal of the album Alternatively, the entire album appears to be a group item in a playlist. In any event, adding an album or a track only adds the corresponding metadata to the playlist.

In one embodiment, a single item is an item pertaining to a track that may be a MP3 file, a MPEG-2 or MPEG-4 advanced audio coding (AAC) file, an Internet stream, a device stream or the like. A group item is a container containing a collection of tracks pertaining to one or more types of characteristics. For example, one type of characteristics of a group item may include all available albums pertaining to a particular artist. Thus each of the albums is a group item itself and includes a number of tracks for the particular album. In another example, one type of characteristics of a group item is for a particular genre, such as jazz, thus all artists, albums and individual tracks that are classified and marked as jazz are included in the container. In this case, the container becomes compounded and may include albums of those artists with jazz. Each of those albums is a container itself including a number of jazz tracks.

One important distinctions of the playlist contemplated in the present invention over the prior art playlist is the structure or the building block structure of the playlist. According to the above embodiment, the metadata for a single item is about 116 bytes and for a group item is 146 bytes, thus a playlist including only a group item pertaining to 10,000 tracks would take about only 146 bytes while the prior art playlist pertaining to all 10,000 tracks could take as much as 1,160,000 bytes. In addition, a deletion of the 10,000 in a group item from the playlist in the present invention is a matter of deleting the group item from the playlist, while in the prior art, it would be a matter to go through the entire list to delete actually the 10,000 single items.

In operation, as a playlist is being executed, the items in the playlist are activated respectively in a predetermined order. When a group item is activated, all items in the group item are activated in an order. One way to determine the order of tracks in the activated item is to traverse the inherent tree structure of the group item by what is commonly referred to as depth-first traversal in data structure. Consequently, all single items in a group item are located and activated to reproduce the sound.

According to one embodiment of the present invention, there are several modes for playback of tracks: shuffle, normal and repeat. In the shuffle play mode, the items are randomly selected from the playlist for playback. In the normal play mode, the items are played sequentially based on the order of items in the playlist. In the repeat mode, the same items in the playlist are repeated.

In order to support the shuffle mode or playing a group of tracks in random order, there are a few requirements in accordance with one embodiment of the present invention. These requirements include: 1) converting a content directory "ObjectId" into a flat list of single items; 2) fetching the flat list from the content directory as a stream of data and processing the data as it comes in without ever storing the entire list in memory on the player; and 3) counting the number of single items (e.g., music files and streams) in each container.

In one embodiment, instead of randomly ordering the items in the entire playlist, a process is configured to randomly select a set of single items from a virtual list which is the union of all items on the playlist. As additional required data, the number of single items in a container (i.e., group item) is added to the metadata of that particular container. One implementation of the present invention to provide the shuffle mode is based on the following algorithms: 1) counting the number of single items within each container; 2) summing up the total number of single items in each container; 3) generating a random number between 0 and a total number of single items minus one (i.e., a linear index of the single item to be selected); 4) determining which container contains the linear index or a random number just generated; and 5) streaming in and playing the appropriate single item from the container.

Figure 3C:
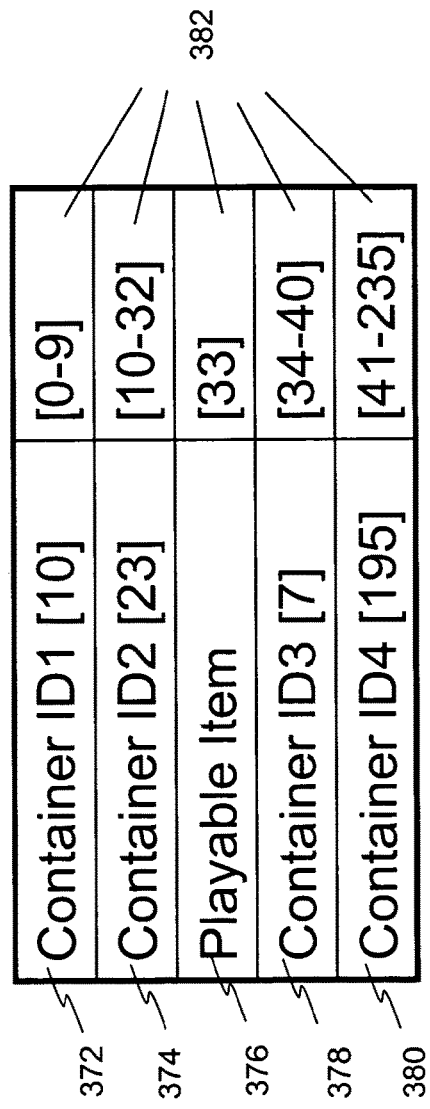
FIG. 3C shows an example of a playlist to demonstrate "shuffle" mode in accordance with one embodiment of the present invention.

To further understand the algorithm, in conjunction with FIG. 3C, the following example shows how a playable item is selected from a playlist 370 of 4 containers (Container ID1 372, Container ID2 374, Container ID3 378, and Container ID4 380) and one playable item 376. Also included in FIG. 3C are the corresponding linear indices 382 of each item. Accordingly, the following procedures are executed: 1) counting the total number of playable items in the playlist; this is 10+23+1+7+195=236; 2) generating a random number between 0 and 235 (inclusive); the resulting number is assumed to be 57 for the example; 3) scanning all items in the playlist in order to locate the one item that contains item number with linear index 57, which is in "Container ID4" because the linear index 57 falls in the range between 41 and 235; 4) fetching in the container "Container ID4" until the item 57 has been reached; 5) storing the metadata (e.g., URL and DisplayName) of the item with linear index 57; and 6) playing the item 57 by retrieving the actual source.

According to one embodiment, instead of loading up all the tracks in a memory for playback in turn, up to only N tracks (e.g., 100) from the container are cached for playback. A pointer is maintained to indicate where the N tracks start and when the next N tracks need to be cached for playback. One of the features of the pointer is that it is flexible enough to cope with additions and deletions of tracks from the container in between when the pointer is established and when it is de-referenced. The pointer takes the form of a path down through the hierarchy under each sub-container, for example, "Genre->Rock->Bruce Springsteen->Born to Run->Thunder Road". With the stored ordinal index of each sub-container in its parent container (i.e., the activated root group item), the pointer may be represented as:

Genre->Rock (index=12—12th item is Bruce Springsteen)
    Bruce Springsteen (index=1—1st item is Born to Run)
        Born to Run (index=1—1st song is Thunder Road)
            Thunder Road Often contents in a container (e.g., a child-container or sub-container in a parent container) are changed while the parent container is being activated for playback. In one embodiment, the following several situations are considered: 1. One or more tracks are inserted before the pointer, those tracks are skipped. 2. One or more tracks are inserted after the pointer, those tracks can be played if the container is made to contain those tracks. 3. One or more tracks are moved/deleted before the pointer, the playback is unaffected. 4. One or more tracks are moved/deleted after the pointer, these tracks are played. 5. A track pointed to by the pointer is deleted, or any container containing the track that is pointed to by the pointer is deleted, a new pointer is established as follows: It is assumed that a track being played is "Thunder Road", the corresponding pointer is "Genre->Rock->Bruce Springsteen->Born to Run->Thunder Road". When the track "Thunder Road" is removed by a user, a new pointer is formulated over the original pointer as "Genre->Rock->Born to Run". If the new pointer is valid, namely pointing a sub-container or another track, then the playback starts from that pointer. If the new pointer is not valid, the new pointer is modified by removing last sections progressively until a valid track or container is pointed or the original parent container is reached. If the original parent container is no longer valid (i.e., it has been deleted), then the next item in the playlist is activated.

FIGS. 4A-C illustrate respectively a sequence of screen displays in accordance with one embodiment of the present invention for managing a playlist. FIG. 4A shows one of the music library screens, wherein a number of tracks 404 are listed as available items to be added to a playlist. Although each of the tracks 404 can be added one by one, a choice "All" 403 is provided to allow the user to select all of the available tracks in the album to be added in the playlist. As shown in FIG. 4A, a highlighted text track "Toxic" 405 indicates that a current cursor position for the list of choices. When the user activates one of the function buttons (e.g., in a controlling device), the action is performed with the choice at the current cursor position. If the list of tracks is too large to be displayed in one screen, a scroll indicator such as an up-arrow, a down-arrow or a scroll sliding bar is displayed to indicate that there are hidden tracks. The user may use a scrolling device (e.g., the scroll wheel 250 in FIG. 2B) to select any item either hidden or displayed within the list.

In the bottom of FIG. 4A, there are a couple of soft keys, namely "View Queue" 406 and "Add to Queue" 408. Activating the key "Add to Queue" 408 adds the highlighted text item "Toxic" 405 to the playlist. In addition, when the "Play Now" 406 soft button is activated, not only is the highlight text item 405 added to the playlist, but the current playing track is also replaced by the highlighted text item 405. In the example of FIG. 4A, when a play command (e.g., "OK" 252 of FIG. 2B) is activated, the highlighted text item "Toxic" 405 is played as the current track as shown in FIG. 4B, and the item "Toxic" 405 is also added to the playlist as shown in FIG. 4C.

FIG. 4B shows the "Now Playing" screen for the zone player in the bedroom. This screen is displayed as soon as the user activates the play function in the screen display as shown in FIG. 4A. The playable item, track, "Toxic" 414 (i.e., the selected highlighted text item 405 in FIG. 4A) is now playing as shown in FIG. 4B. Other than the status information (e.g., artist, album, etc.) about the track is now playing, the user is given an option to "view Queue" 416 as one of the soft keys is activated. The "view Queue" 416 function allows the user to see the playlist on the screen of a controlling device. Once the user activates the "view Queue" 416 soft key, the screen display shows the playlist in FIG. 4C.

The playlist including a plurality of items is displayed in a scrollable list 420 in FIG. 4C. In one embodiment, the playable item is indicated with a music symbol "#" 424 followed by the name of the track. The group item is listed as the name of the item 426 followed by the total number of tracks enclosed in brackets within the group item. The current playing track is indicated by a currently playing symbol ">" 428. In this case, the track "Toxic" (i.e., the highlighted text item 405 in FIG. 4A, also the now playing track 414 in FIG. 4B) is now playing, therefore the symbol ">" is shown next to the item 428. In FIG. 4C, there are also three playlist control functions (i.e., Remove/Clear 432, Save Queue 434 and Close Queue 436) shown as soft keys at the bottom of the screen display.

The playlist control function soft keys are controlled by the user via a user interface of the controlling device. The "Remove/Clear" 432 button provides two functions. When the delete function is activated, the highlighted item 430 is deleted from the playlist. The item 430 may be a playable item or a group item. The user selects one of the items from the playlist by using a scrolling device. Again, there may be hidden items when the playlist is too large to fit in one screen display. The clear function for the "Remove/Clear" 432 button clears the entire playlist. The "Save Queue" function 434 allows the user to save a copy of the playlist as shown on the screen. The saved playlist may be manipulated again at any time. As soon as "Close Queue" button 436 is activated, the screen display in FIG. 4C is closed.

Figure 5A:
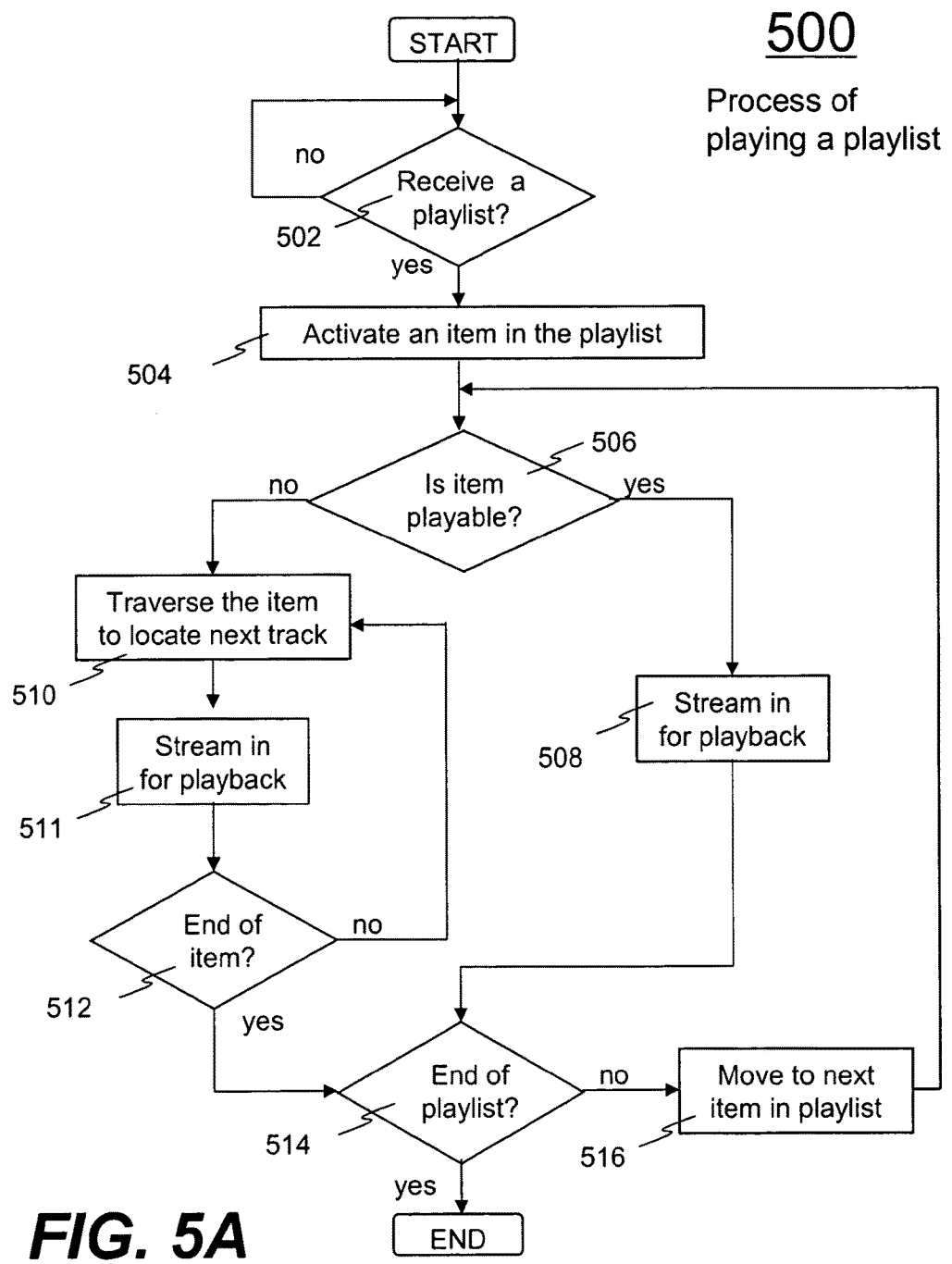
FIGS. 5A and 5B show a flowchart or process of implementing one embodiment of the present invention to manage a playlist.
Figure 5B:
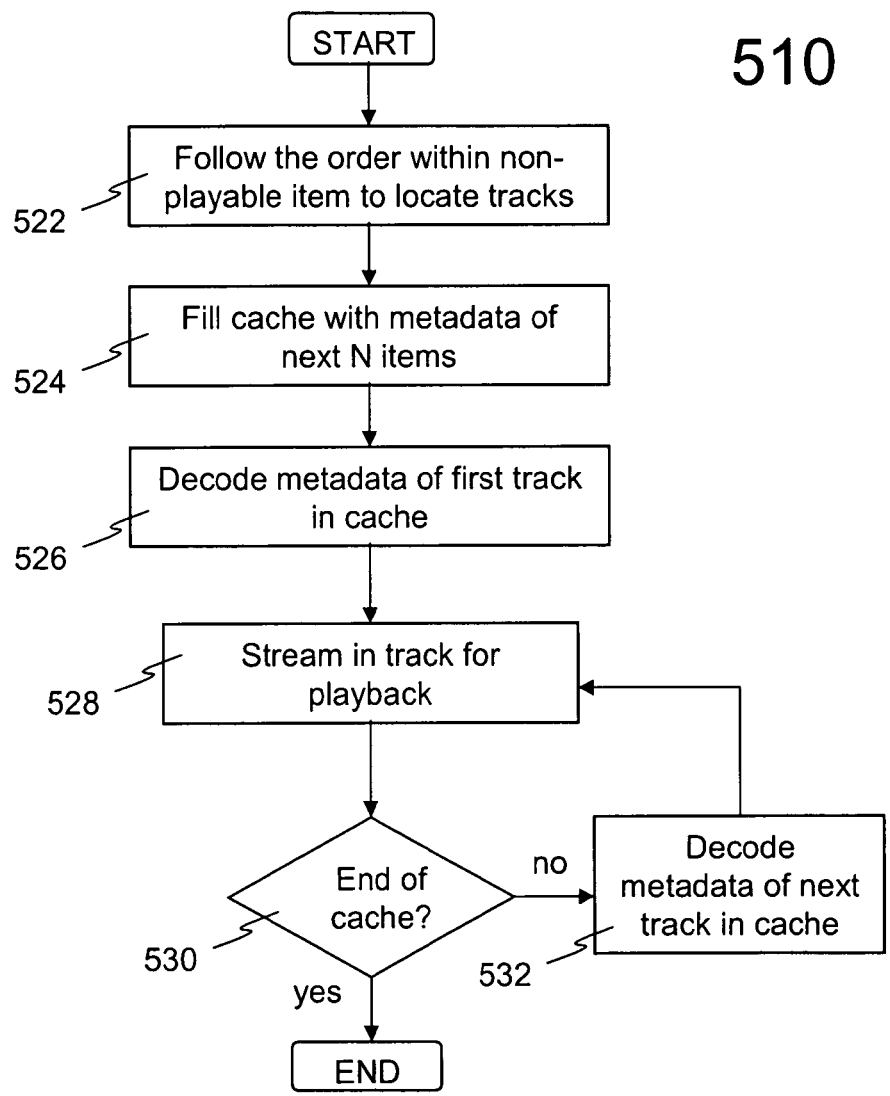
Figure 6:
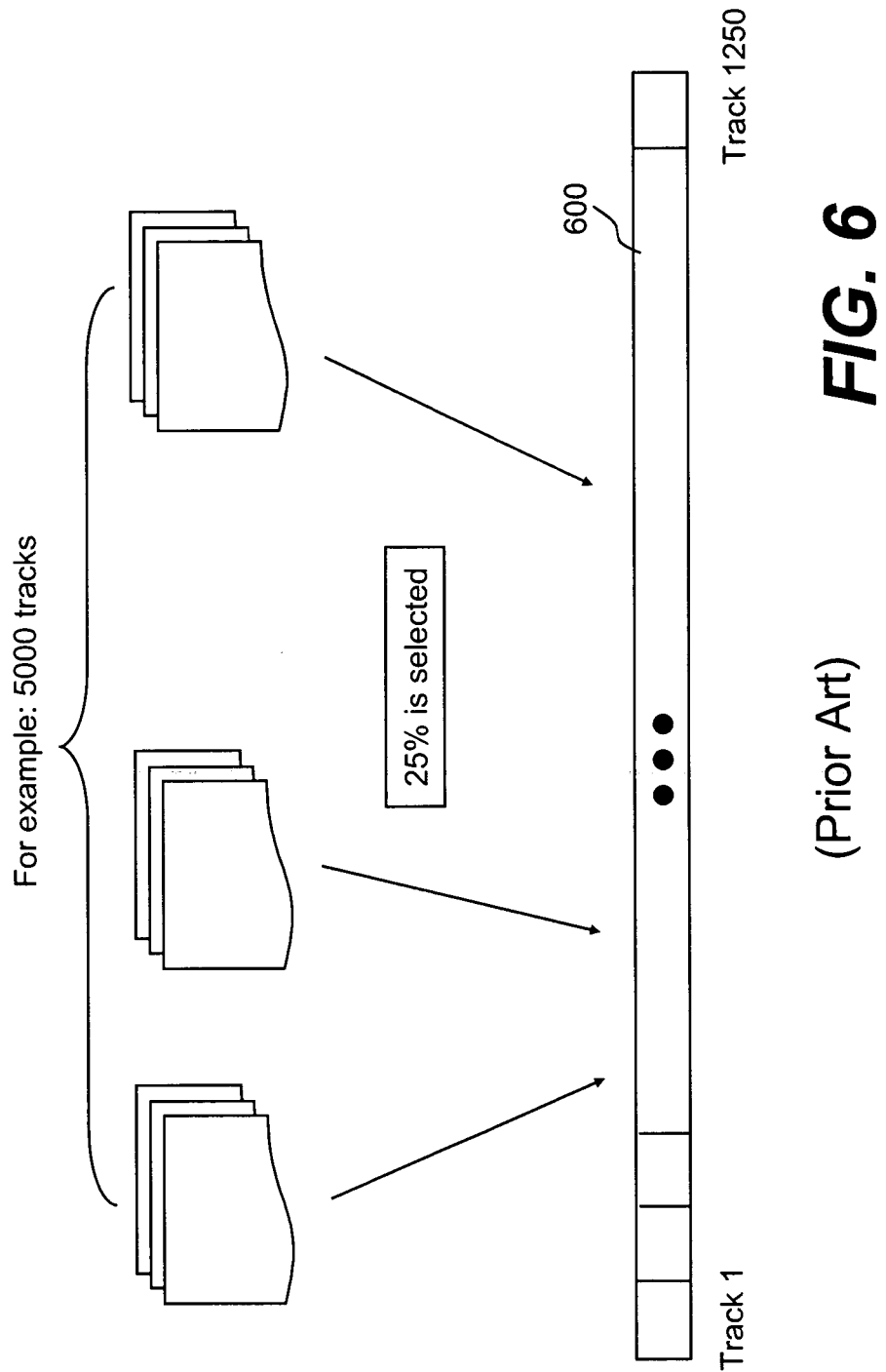
FIG. 6 shows a playlist in prior art.

Referring now to FIGS. 5A and 5B, there is shown a flowchart or process 500 of implementing one embodiment of the present invention for playing on a playlist. The process 500, which is preferably understood in conjunction with the previous figures especially with FIGS. 2A, 2C, and 3, may be implemented in software, hardware, or a combination of both. According to one embodiment, an application module implementing the process 500 is embedded in a device coupled to a network. Preferably the device includes a display screen, such as a controlling device or a computer. The module may be loaded in the memory 284 to be executed by the processor 276 and operating in conjunction with user input commands received through a network interface 280.

The process 500 in FIG. 5A starts at 502 with a player determining if it has received a playlist. The player stands by at 502 until a playlist has been received. In one embodiment, a playlist is originally stored in one of the devices on a network and downloaded into a device for update. In another embodiment, the playlist is in a controlling device. After the playlist is received or available, the player executes the playlist in accordance with a play mode (e.g., shuffle, repeat, normal, etc.).

At 504, the player starts at an item on the playlist or an item in the playlist is activated. The process 500 splits into two paths at 506 depending upon whether the item for playback is playable or not. If the item is playable, the test at 506 is true and the process 500 moves to 508 where the source of the track is streamed in for playback from a location encoded in the metadata (e.g., a URL, a pointer, a file name) of the playable track. When the player finishes the playback of the playable item, the process 500 ends at 514 to determine if the end of the playlist has been reached.

Referring back 506, when the activated item is a group, the process 500 goes to 510 in which the group item is traversed, perhaps recursively, to retrieve all playable items included in the activated item. The playable items are played sequentially at 511. The details of the traversing process 510 of locating the next track is described in FIG. 5B below. At 512, the process 500 checks if a last group item in the activated item has been reached. If not, the process 500 goes back to 510 continuing the traversing process for another track for playback until all tracks within the group item have been located for playback. When the last playable item in the activated item is reached, the process 500 ends at 514 to determine if the end of playlist has been reached.

At 514, if the playlist is not ended yet, which means there are more items in the playlist. The process 500 moves down to the next item in the playlist at 516. Then the process 500 moves back to 506 to repeat the same process of the previous item. Finally if the test at 514 is true, the process 500 ends because there are no more items to play. However, if the play mode is set to repeat, the process 500 does not end at all, instead the player will start processing the first item in the playlist again. If the play mode is set to shuffle, then above described next track or item is randomly selected from the playlist instead of next track or item in the sequential order.

Referring now to FIG. 5B, there is shown, according to one embodiment, a detailed process 510 of traversing an activated group item for locating a track for playback. At 522, the process 510 traverses the activated item to locate tracks. Similar to traversing a tree structure in data structure, the process 510 traverses the hierarchical items branch by branch to locate tracks at 522. At 524, the metadata (i.e., pointer, URL, file in a shared folder, etc.) of next N tracks located at 522 is loaded into a cache (e.g., 282 in FIG. 2C). N is a positive integer depending on the size of the cache. In one embodiment, the metadata of 100 items are saved in the cache.

At 526, the metadata of the first track in cache is decoded. Then at 528, the source of the track is streamed in for playback from a location decoded from the metadata. After the playback of the source is finished, the process 510 moves to 530 to determine if the end of the cached N metadata has reached. If the test at 530 is false, that means there are still additional track metadata in the cache. The process 510 moves to 532 to decode the metadata of the next track. Then the process moves back to 528 repeating the streaming and playing of the next track. If the test at 530 is true, the process 510 ends.

One of the key features in the present invention is to keep only metadata of items in a playlist, and the items could be playable or group, such that the playlist contemplated in the present invention can accommodate as many items as desired in a limited memory space without compromising the manageability of the playlist. When a playable item is played, the corresponding metadata is decoded to retrieve the source (e.g., from another device) to be played in a designated player.

By virtue of the present invention, the playlist now becomes easy to manage. When an item is added to, deleted from, or re-arranged in a playlist, a user does not need to care what the item is, whether the item is a single track or includes hundreds of tracks. For example, a user can delete all tracks from a particular artist with one delete operation in accordance with the current invention, while the user needs to delete one track at a time using the prior art method.

The present invention can be implemented in many ways, each of which may yield one or more of the following benefits, advantages or features. One of them is a mechanism provided to enable a user to include unlimited numbers of items in a playlist for playback in a limited amount of memory of a device. Second, an interactive graphic user interface is provided to enable a user to manage, create, delete or modify a playlist. Other benefits, advantages or features can be appreciated by those skilled in the art given the detailed description herein.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims. For example, a time of a day, or other outside influences (e.g., a temperature, a light level, presence detection in a rooms and etc.) may be expressed in the rule set for the playlist so that the playlist may be executed somewhat intelligently. In operation, a streaming source can be played at a specific time of day for a specific period of time so that one could catch the news or a particular show. Accordingly, the scope of the present invention is defined by the appended claims rather than the forgoing description of embodiments.

The invention claimed is:

1. A method performed by a computing device, the method comprising:

configuring a single play queue comprising network addresses of a plurality of multimedia items for playback by one or more playback devices separate from the computing device, wherein the single play queue of network addresses is stored on at least one of the one or more playback devices, wherein the single play queue, when executed by at least one of the one or more playback devices causes the one or more playback devices to play the multimedia items stored at the network addresses in the single play queue, and wherein the single play queue of network addresses comprises at least (i) a network address for a single track playable by the one or more playback devices and (ii) a network address for an internet radio stream playable by the one or more playback devices, wherein the network address for the single track is different than the network address for the internet radio stream;

sending one or more commands to execute the single play queue to at least one of the one or more playback devices, thereby causing the one or more playback devices to execute the single play queue; and while the one or more playback devices are executing the single play queue, displaying a graphical representation of the single play queue via a graphical user interface associated with the computing device, wherein the graphical representation of the single play queue indicates that the single track is playing when the one or more playback devices are playing the single track from the single track's corresponding network address stored in the single play queue, and the graphical representation of the single play queue indicates that the internet radio stream is playing when the one or more playback devices are playing the internet radio stream from the internet radio stream's corresponding network address stored in the single play queue.

2. The method of claim 1, further comprising,
receiving a command setting forth a specified period of time that the one or more playback devices should play the internet radio stream.

3. The method of claim 2, wherein the specified period of time is displayed via the graphical user interface.

4. The method of claim 3, wherein the specified period of time is displayed in association with the internet radio stream.

5. The method of claim 1, further comprising:
displaying, via the graphical user interface, information identifying how at least one item in the single play queue was added to the single play queue.

6. The method of claim 1, further comprising:
displaying, via the graphical user interface, at least a portion of the network address of the internet radio stream.

7. The method of claim 1, wherein the one or more playback devices comprises a first playback device and a second playback device, wherein the one or more playback devices playing the single track comprises the first playback device playing the single track in synchrony with the second playback device, and wherein the one or more playback devices playing the internet radio stream comprises the first playback device playing the internet radio stream in synchrony with the second playback device.

8. A tangible, non-transitory computer-readable storage medium including a computer program which, when executed by one or more processors, causes a computing device to implement a method comprising:
configuring a single play queue comprising network addresses of a plurality of multimedia items for playback by one or more playback devices separate from the computing device, wherein the single play queue of network addresses is stored on at least one of the one or more playback devices, wherein the single play queue, when executed by at least one of the one or more playback devices causes the one or more playback devices to play the multimedia items stored at the network addresses in the single play queue, and wherein the single play queue of network addresses comprises at least (i) a network address for a single track playable by the one or more playback devices and (ii) a network address for an internet radio stream playable by the one or more playback devices, wherein the network address for the single track is different than the network address for the internet radio stream;
sending one or more commands to execute the single play queue to at least one of the one or more playback devices, thereby causing the one or more playback devices to execute the single play queue; and
while the one or more playback devices are executing the single play queue, displaying a graphical representation of the single play queue via a graphical user interface associated with the computing device, wherein the graphical representation of the single play queue indicates that the single track is playing when the one or more playback devices are playing the single track from the single track's corresponding network address stored in the single play queue, and the graphical representation of the single play queue indicates that the internet radio stream is playing when the one or more playback devices are playing the internet radio stream from the internet radio stream's corresponding network address stored in the single play queue.

9. The tangible, non-transitory computer-readable storage medium of claim 8, further comprising:
configuring the single play queue to cause the one or more playback devices to play the internet radio stream for a specified period of time.

10. The tangible, non-transitory computer-readable storage medium of claim 9, wherein the specified period of time is displayed via the graphical user interface.

11. The tangible, non-transitory computer-readable storage medium of claim 10, wherein the specified period of time is displayed in association with an identification of the internet radio stream.

12. The tangible, non-transitory computer-readable storage medium of claim 8, wherein the method further comprises displaying, via the graphical user interface, information identifying how at least one item in the single play queue was added to the single play queue.

13. The tangible, non-transitory computer-readable storage medium of claim 8, wherein the method further comprises displaying, via the graphical user interface, at least a portion of the network address of the internet radio stream.

14. The tangible, non-transitory computer-readable storage medium of claim 8, wherein the one or more playback devices comprises a first playback device and a second playback device, wherein the one or more playback devices playing the single track comprises the first playback device playing the single track in synchrony with the second playback device, and wherein the one or more playback devices playing the internet radio stream comprises the first playback device playing the internet radio stream in synchrony with the second playback device.

15. A controller device comprising:
one or more processors;
a display screen; and
tangible, non-transitory, computer-readable memory comprising instructions encoded thereon, wherein the instructions, when executed by the one or more processors, causes the controller device to perform a method comprising:
configuring a single play queue comprising network addresses of a plurality of multimedia items for playback by one or more playback devices separate from the controller device, wherein the single play queue of network addresses is stored on at least one of the one or more playback devices, wherein the single play queue, when executed by at least one of the one or more playback devices causes the one or more playback devices to play the multimedia items stored at the network addresses in the single play queue, and wherein the single play queue of network addresses comprises at least (i) a network address for a single track playable by the one or more playback devices and (ii) a network address for an internet radio stream playable by the one or more playback devices, wherein the network address for the single track is different than the network address for the internet radio stream;
sending one or more commands to execute the single play queue to at least one of the one or more playback devices, thereby causing the one or more playback devices to execute the single play queue; and while the one or more playback devices are executing the single play queue, displaying a graphical representation of the single play queue via the display screen, wherein the graphical representation of the single play queue indicates that the single track is playing when the one or more playback devices are playing the single track from the single track's corresponding network address stored in the single play queue, and the graphical representation of the single play queue indicates that the internet radio stream is playing when the one or more playback devices are playing the internet radio stream from the internet radio stream's corresponding network address stored in the single play queue.

16. The controller device of claim 15, wherein the method further comprises:

receiving a command setting forth a specified period of time that the one or more playback devices should play the internet radio stream; and after receiving the command setting forth the specified period of time, configuring the single play queue stored on the one or more playback devices to cause the one or more playback devices to play the internet radio stream for the specified period of time.

17. The controller device of claim 16, wherein the method further comprises:

displaying via the display screen, the specified period of time.

18. The controller device of claim 17, wherein the method further comprises:

displaying via the display screen, the specified period of time in association with an identification of the internet radio stream.

19. The controller device of claim 15, wherein the method further comprises:

displaying via the display screen, information identifying how at least one item in the single play queue was added to the single play queue.

20. The controller device of claim 15, wherein the method further comprises:

displaying via the display screen, at least a portion of the network address of the internet radio stream.

21. The tangible, non-transitory computer-readable storage medium of claim 8, wherein the method further comprises:

receiving an indication of the single track from at least one of the one or more playback devices when the one or more playback devices are playing the single track from the single track's corresponding network address stored in the single play queue; and receiving an indication of the internet radio stream from at least one of the one or more playback devices when the one or more playback devices are playing the internet radio stream from the internet radio stream's corresponding network address stored in the single play queue.

22. The method of claim 1, further comprising:

receiving a command to add a group item to the single play queue stored on at least one of the one or more playback devices, wherein the group item comprises a plurality of network addresses for a corresponding plurality of single tracks playable by the one or more playback devices; and in response to receiving the command to add the group item to the single play queue stored on at least one of the one or more playback devices, adding the plurality of network addresses corresponding to the plurality of single tracks to the single play queue stored on at least one of the one or more playback devices.

23. The method of claim 1, wherein the single play queue of network addresses further comprises a group item that includes a plurality of network addresses for a corresponding plurality of single tracks, and wherein the method further comprises:

receiving a command to delete the group item from the single play queue stored on at least one of the one or more playback devices; and in response to receiving the command to delete the group item from the single play queue stored on at least one of the one or more playback devices, removing the plurality of network addresses corresponding to the plurality of single tracks from the single play queue stored on at least one of the one or more playback devices.

* * * * *